to operate in the presence of a solvent. As such there may for example be used hydrocarbons such as benzine or benzene, halogen hydrocarbons such as methylene chloride or chloroform, ethers such as diethyl ether or di-isopropyl ether or ketones such as acetone. In order to obtain the end products in good yields, it is of advantage to add basic compounds such as alkali metal carbonates, alkali metal bicarbonates or tertiary amines for binding the hydrohalic acid that is set free. The reaction can be carried out at slightly reduced or slightly raised temperatures. It is of advantage to operate at temperatures ranging between −10° C. and +10° C. and to remove the reaction heat set free by means of a cooling bath.

NEW PIPERAZINE-CARBOXYLIC ACID ESTERS AND PROCESS OF PREPARING THEM

Dieter Schmidt-Barbo, Hofheim (Taunus), Friedrich Hampe, Bad Soden (Taunus), and Manfred Schorr and Georg Lämmler, Frankfurt am Main, Germany, assignors to Farbwerke Hoechst Aktiengesellschaft vormals Meister Lucius & Bruning, Frankfurt am Main, Germany, a corporation of Germany No Drawing. Filed Mar. 7, 1958, Ser. No. 719,757

Claims priority, application Germany Mar. 8, 1957

7 Claims. (Cl. 260—268)

It is known that certain piperazine derivatives have gained special importance for the control of blood parasites. The 1-diethyl-carbamino-4-methyl-piperazine, for example, is effective against filariae. In addition, certain 2-halogeno-4-amino-alkylamino-toluenes are active against schistosome infections. Furthermore, basically substituted 4-halogeno-2-amino-1,3,5-trimethyl-benzenes have already been recommended as medicaments against schistosome infections.

The present invention relates to new piperazine-carboxylic acid esters which are active against schistosomiasis and correspond to the general formula

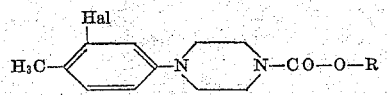

in which Hal stands for a halogen atom, preferably chlorine, and R for an aliphatic, aromatic or mixed aliphatic-aromatic hydrocarbon radical which may also be substituted by halogen atoms, amino, ether and/or free or esterified carboxyl groups.

The present invention relates also to a process for the preparation of such piperazine-carboxylic acid esters by reacting 1-(3'-halogeno-4'-methyl-phenyl)-piperazines with halogen-formic acid esters of the general formula X—CO—O—R, in which R has the indicated significance and X stands for a halogen atom, preferably chlorine, and by transforming any benzyl ester or benzyl ether groupings by catalytic hydrogenation into carboxyl or hydroxyl groups or by replacing any halogen atoms that may be present by a corresponding amino group by treatment with ammonia, primary or secondary amines.

The 1-(3'-halogeno-4'-methyl-phenyl)-piperazines used as starting material may for example be prepared according to the processes described in U.S. patent application Ser. No. 522,858, now U.S. Patent 2,830,056, by reacting para-toluidines substituted in the nucleus with reactive esters of diethanolamine or by reacting para-toluidines substituted in the nucleus with ethylene oxide or ethylene halogen-hydrins and transforming the primary alcohol groups of the condensation products into reactive ester groups and reacting the esters with ammonia or by reacting 3-nitro-4-halogen-toluenes substituted in the nucleus with piperazine, reducing the nitro-group to the amino group, transforming the latter into the diazonium group, replacing this in usual manner by hydrogen or subjecting it to the Sandmeyer reaction.

As halogen-formic acid esters there may for example be used chloro-formic acid methyl ester, chloro-formic acid ethyl ester, chloro-formic acid isopropyl ester, chloro-formic acid amyl ester, chloro-formic acid isoamyl ester, chloro-formic acid diethyl-amino-ethyl ester, chloro-formic acid carbethoxy-methyl ester, chloro-formic acid butoxy-ethyl ester, chloro-formic acid chlorethyl ester, chloro-formic acid phenyl ester, chloro-formic acid methoxy-phenyl ester, chloro-formic acid propoxy-phenyl ester, chloro-formic acid benzyloxy-phenyl ester, chloro-formic acid carbo-benzyloxy-phenyl ester, chloro-formic acid tolyl ester, chloro-formic acid nonyl-phenyl ester and chloro-formic acid chloro-phenyl ester.

The process according to the invention can be carried out by reacting 1-(3'-halogeno-4'-methyl-phenyl)-piperazines with halogen-formic acid esters. In this case it is advisable If the hydrocarbon radical R of the piperazine-carboxylic acid esters thus obtained is substituted by one or several reactive groups, further reactions can be carried out with these. Thus, it is for example possible to transform a benzyl ester or benzyl ether by catalytic hydrogenation into a free carboxyl or hydroxyl group or to replace a halogen atom by an amino group by treatment with ammonia or a primary or secondary amine.

The piperazine-carboxylic acid esters obtained according to the invention represent colorless crystalline substances or very viscous oils which are practically insoluble in water but are as a rule easily soluble in organic solvents, in oils and in fats. However, if the substances contain a basic or acid group, it is possible to obtain water-soluble substances by salt formation, for example with alkali metal hydroxides or inorganic or organic acids.

According to the process of the present invention there is obtained a new group of compounds which are valuable medicaments. They are particularly suitable for the control of schistosome infections in warm-blooded animals. As compared with other substances being active against schistosomiasis, they are very well tolerable and can be administered parenterally.

The products of the present invention are particularly suitable for parenteral administration and for this purpose they can either be dissolved in oils, for example olive oil or neat's-foot oil, or—as far as they form neutral, water-soluble salts—also in water.

In the following table there are compared two of the claimed compounds (Nos. 1 and 2) with 3 known compounds (Nos. 3, 4 and 5) of comparable constitution as regards their activity in schistosome infections. The tests were carried out in the following way:

Albino mice are each infected subcutaneously with about 40 cercariae of the strain Liberia of *Schistosoma mansoni*. Upon termination of the period of pre-potency and determination of the discharge of eggs in the feces, the mice are treated with the substance to be tested. The result of the treatment is controlled by consecutive examinations of the feces and on the 60th day after the treatment the mice are dissected. The dosis curativa is that dose of the compound which kills all worms in the mice infected with *Schistosoma mansoni*.

| No | Compound | Administration | Maximum tolerated dose per 20 g. of mouse, mg. | Dosis curativa per 20 g. of mouse, mg. | Chemotherapeutic index |
| --- | --- | --- | --- | --- | --- |
| 1 | 1-(3'-chloro-4'-methylphenyl)-piperazine-4-carboxylic acid-(2''-methoxy-4''-allyl-phenyl) ester. | subcutaneously / per os | >40 / >40 | 2.0 / 2.0 | >20 / >20 |
| 2 | 1-(3'-chloro-4'-methylphenyl)-piperazine-4-carboxylic acid-(3''-chloro-4''-methyl-phenyl) ester. | subcutaneously / per os | >40 / >40 | 3.0 / 2.0 | >13 / >20 |
| 3 | 2-chloro-4-diethylamino-ethylamino-toluene hydrochloride | per os | 5-7 | 2.2 | 2.2-3.2 |
| 4 | 2-chloro-4-diethylamino-ethylamino-1,3,5-trimethyl-benzene hydrochloride. | per os | 5-7 | 0.7 | 7-10 |
| 5 | 1-(3'-chloro-4'-methyl-phenyl)-piperazine maleate | per os | 4-6 | 0.5 | 8-12 |

The comparison of the test results clearly shows the improved schistosomicidal activity of the products of the present invention. The superiority of these piperazine carboxylic acid esters consists furthermore in the fact that they are also very effective in mice, cotton rats and monkeys when administered parenterally and that they are well tolerated locally when administered intramuscularly in the form of oily solutions or aqueous suspensions.

The following examples serve to illustrate the invention but they are not intended to limit it thereto:

EXAMPLE 1

*1-(3'-chloro-4'-methyl-phenyl)-piperazine-4-carboxylic acid methyl ester*

To a solution cooled to +5° C. of 21 grams of 1-(3' chloro-4'-methyl-phenyl)-piperazine (colorless oil boiling at 136–137° C. under a pressure of 0.5 mm. of mercury) in 100 cc. of benzene, to which 10 grams of triethyl amine have been added, there are added dropwise within 45 minutes, while stirring and cooling with ice water, 10 grams of chloro-formic acid methyl ester. The whole is stirred for another 2 hours while the temperature rises to 20° C. Thereupon, the trimethylamine hydrochloride that has formed is filtered off and the filtrate is freed from benzene. The oily residue crystallizes from highly boiling petroleum ether as the 1-(3'-chloro-4'-methyl-phenyl)-piperazine-4'-carboxylic acid methyl ester melting at 59–60° C. in a yield of 20 grams.

EXAMPLE 2

*1-(3'-chloro-4'-methyl-phenyl)-piperazine-4-carboxylic acid ethyl ester*

To a solution of 32 grams of 1-(3'-chloro-4'-methyl-phenyl)-piperazine and 17 cc. of pyridine in 200 cc. of chloroform there is added dropwise at 5°–10° C., while stirring, a solution of 16.5 grams of chloroformic acid ethyl ester in 25 cc. of chloroform. After standing for 1 hour, the clear yellow solution is diluted with chloroform, washed with 0.5 N-hydrochloric acid, a potassium bicarbonate solution and water, dried and distilled. 39 grams of a viscous, almost colorless oil distils over at a boiling point of 160–165° C. under a pressure of 0.2 mm. of mercury. Upon distillation it yields 32 grams of 1-(3'-chloro-4'- methyl-phenyl) - piperazine-4 - carboxylic acid ethyl ester boiling at 163–166° C. under a pressure of 0.2 mm. of mercury and melting at 39–40° C.

EXAMPLE 3

*1-(3'-chloro-4'-methyl-phenyl)-piperazine - 4 - carboxylic acid butyl ester*

If, as described in Example 1, there are added dropwise at 0–10° C., while stirring and cooling, 14 grams of chloroformic acid butyl ester to 21 grams of 1-(3'-chloro-4'-methyl-phenyl-piperazine in 100 cc. of benzene, there is obtained, after working up, the 1-(3'-chloro-4'-methyl-phenyl)-piperazine-4-carboxylic acid butyl ester in the form of an oil that is distilled at 198–202° C. under a pressure of 1 mm of mercury. After a short time, the substance commences to crystallize and melts at 31–32° C.; the yield amounts to 18 grams.

EXAMPLE 4

*1-(3'-chloro-4'-methyl-phenyl) - piperazine - 4-carboxylic acid isoamyl ester*

By reacting 15 grams of chloroformic acid isoamyl ester according to the directions given in Example 1 the 1-(3'-chloro-4'-methyl-phenyl) - piperazine-4 - carboxylic acid isoamyl ester is obtained in the form of an oil, which cannot be distilled under a reduced pressure of 2 mm. Hg and up to 200° C.

EXAMPLE 5

*1-(3'-chloro-4'-methyl-phenyl)-piperazine - 4 - carboxylic acid phenyl ester*

To a solution of 10.5 grams of 1-(3'-chloro-4'-methyl-phenyl)-piperazine and 5 grams of triethylamine in 50 cc. of benzene there are added at 0–10° C., while stirring and cooling, 7.5 grams of chloroformic acid phenyl ester. A precipitate of triethylamine hydrochloride separates at once. After stirring for another 2 hours, water is added to the reaction mixture. The benzene layer is eliminated in the separating funnel, washed with water, dried and the benzene is distilled off. The residue is the 1-(3'-chloro-4'-methyl-phenyl-piperazine - 4 - carboxylic acid phenyl) ester which crystallizes in fine needles melting at 142–144° C.

EXAMPLE 6

*1-(3'-chloro-4'-methyl-phenyl)-piperazine- 4 - carboxylic acid-4''-carbo-n-propyloxy) ester*

By adding dropwise at 0–10° C., while stirring, a solution of 21 grams of 1-(3'-chloro-4'-methyl-phenyl)-piperazine and 10 grams of triethylamine in 75 cc. of benzene to 24 grams of chloroformic acid-para-carbo-n-propyloxyphenyl ester, the 1-(3'-chloro-4'-methyl-phenyl) - piperazine - 4 - carboxylic acid - (4''-carbo-n-propyloxy-phenyl) ester is obtained which melts at 125–126° C. after recrystallization from methanol.

EXAMPLE 7

*1-(3'-chloro-4'-methyl-phenyl)-piperazine - 4 - carboxylic acid-(4''-nonyl-phenyl) ester*

To a solution of 21 grams of 1-(3'-chloro-4'-methyl-phenyl)-piperazine and 10 grams of triethylamine in 75 cc. of benzene there are added dropwise at 0–5° C., while stirring and cooling, 28 grams of chloroformic acid-4-nonyl-phenyl ester. The 1-(3'-chloro-4'-methyl-phenyl)-piperazine -4-carboxylic acid-(4''-nonyl-phenyl) ester is formed which, after purifying, is obtained in the form of a light yellow oil. The yield amounts to 31 grams.

EXAMPLE 8

*1 - (3' - chloro - 4' - methyl - phenyl) - piperazine - 4-carboxylic acid-(2''-methyl-5''-isobutyl-phenyl) ester*

21 grams of 1-(3'-chloro-4'-methyl-phenyl)-piperazine and 10 grams of triethylamine are dissolved in 75 cc. of benzene and cooled to 0°–5° C. To the solution are added dropwise, while stirring, 22.6 grams of chloroformic acid-2-methyl-5-isobutyl-phenyl ester. Upon termination of the reaction, the precipitated triethylamine hydrochloride is dissolved by addition of water, the benzene solution is eliminated in the separating funnel, dried and finally the benzene is distilled off. The 1-(3'-chloro-4'-methyl-phenyl)-piperazine-4-carboxylic acid-(2"-methyl-5"-isobutyl-phenyl) ester is obtained in the form of a brownish oil that does not crystallize; the yield amounts to 30 grams.

EXAMPLE 9

(a) *1 - (3' - chloro - 4' - methyl - phenyl) - piperazine-4 - carboxylic acid - (4" - carbo - benzyloxy - phenyl) ester*

21 grams of 1-(3'-chloro-4'-methyl-phenyl)-piperazine and 10 grams of triethylamine are dissolved in 100 cc. of benzene. To this solution are added dropwise at 0-10° C., while stirring and cooling with ice, 29 grams of chloroformic acid-4-carbo-benzyloxy-phenyl ester dissolved in 25 cc. of benzene. The whole is stirred for another 2 hours while the temperature rises slowly to 20° C. and is then worked up by adding water, separating the benzene layer, washing the same with water and evaporating the benzene. The residue crystallizes soon and can be purified from ethyl acetate by addition of highly boiling petroleum ether. The melting point of the 1-(3'-chloro-4' - methyl - phenyl) - piperazine - 4 - carboxylic acid-(4"-carbo-benzyloxy-phenyl) ester amounts to 77-78° C.

(b) *1 - (3' - chloro - 4' - methyl - phenyl) - piperazine-4-carboxylic acid-(4"-carboxy-phenyl) ester*

In order to split off the benzyl radical from the above described product 18.6 grams of this ester are suspended in a shaker in 200 cc. of methanol in which it partly dissolves. The mixture is shaken at room temperature with hydrogen in the presence of palladium as catalyst. After 5 hours the necessary amount of hydrogen has been taken up. The contents of the shaker is washed into a flask by means of 300 cc. of methanol, the catalyst is filtered off in the heat and the filtrate is allowed to crystallize in ice. The 1 - (3' - chloro - 4' - methyl - phenyl) - piperazine-4-carboxylic acid-(4"-carboxyphenyl) ester crystallizes in the form of white needles melting at 201-202° C.

EXAMPLE 10

*1 - (3' - chloro - 4' - methyl - phenyl) - piperazine - 4-carboxylic acid-(4"-isododecyl-phenyl) ester*

13.5 grams of 1-(3'-chloro-4'-methyl-phenyl)-piperazine and 7 grams of triethylamine are dissolved in 50 cc. of benzene, stirred and cooled to +5° C. At this temperature a solution of 21 grams of chloroformic acid-4-isododecyl-phenyl ester in 20 cc. of benzene is added. The mixture is worked up as usual by addition of water, separating the benzene layer, washing and drying the same. Upon distillation of the benzene a light yellow oil is obtained that does not crystallize. The yield amounts to 18 grams of 1-(3'-chloro-4'-methyl-phenyl)-piperazine-4-carboxylic acid-(4"-isododecyl-phenyl) ester.

EXAMPLE 11

*1 - (3' - chloro - 4' - methyl - phenyl) - piperazine - 4-carboxylic acid-(4"-isooctyl-phenyl) ester*

To a solution of 21 grams of 1-(3'-chloro-4'-methyl-phenyl)-piperazine and 10 grams of triethylamine in 75 cc. of benzene there are added dropwise at 5° C., while stirring and cooling, 27 grams of chloroformic acid-4-isooctyl-phenyl ester in 25 cc. of benzene. After stirring for 2 hours without cooling, the reaction mixture is allowed to stand over night and is worked up on the following day as described in the preceding examples. The 1-(3'-chloro - 4' - methyl - phenyl) - piperazine - 4 - carboxylic acid-(4"-isooctyl-phenyl) ester is obtained in the form of an oil that cannot be distilled without decomposition.

EXAMPLE 12

*1 - (3' - chloro - 4' - methyl - phenyl) - piperazine - 4-carboxylic acid-(4"-tert.-butyl-phenyl) ester*

21 grams of 1-(3'-chloro-4'-methyl-phenyl)-piperazine and 10 grams of triethylamine are dissolved in 100 cc. of benzene. The solution is cooled to 0-+5° C., while stirring and at this temperature there are added dropwise 21 grams of chloroformic acid-para-tert.-butyl-phenyl ester. The reaction mixture is stirred for another hour at 5° C. and worked up on the following day as usual. The 1-(3'-chloro - 4' - methyl - phenyl) - piperazine - 4 - carboxylic acid-(4"-tert.butyl-phenyl) ester crystallizes from alcohol in tufts of fine needles melting at 129° C.

EXAMPLE 13

*1 - (3' - bromo - 4' - methyl - phenyl) - piperazine - 4-carboxylic acid-(4"'-tert.butyl-phenyl) ester*

A solution of 25.5 grams of 1-(3'-bromo-4'-methyl-phenyl)-piperazine and 10 grams of triethylamine in 125 cc. of benzene is cooled to 0-5° C. and, while stirring, there are added dropwise 21 grams of chloroformic acid-para-tert.butyl-phenyl ester in 20 cc. of benzene. The reaction solution is stirred, while the temperature rises slowly to about 20° C., and is allowed to stand over night. Upon working up as described in the preceding examples the desired compound is obtained that melts at 138-141° C. after recrystallization from alcohol. The yield amounts to 32 grams.

EXAMPLE 14

*1 - (3' - chloro - 4' - methyl - phenyl) - piperazine - 4-carboxylic acid-(β-butoxy-ethyl) ester*

21 grams of 1-(3'-chloro-4'-methyl-phenyl)-piperazine are dissolved in 75 cc. of benzene and 10 grams of triethylamine are added. To the reaction mixture is added at 0-10° C., while stirring and cooling, a solution of 16.6 grams of chloroformic acid-butoxy-ethyl ester in 20 cc. of benzene. After the temperature has risen to about 20° C., the reaction mixture is stirred for another hour and allowed to stand over night. After addition of water and vigorous shaking in the separating funnel the benzene layer is eliminated, washed and dried and finally the benzene is distilled off. A brownish liquid is obtained that cannot be distilled at a pressure of 2 mm. of Hg up to 250° C. and does not solidify. The yield amounts to 25 grams.

EXAMPLE 15

*1-(3'-bromo-4'-methyl-phenyl)-piperazine-4-carboxylic acid-(β-butoxy-ethyl) ester*

To a mixture of 25.5 grams of 1-(3'-bromo-4'-methyl-phenyl)-piperazine and 10 grams of triethylamine in 75 cc. of benzene according to Example 14 there is added dropwise at 0-10° C., while stirring and cooling, a solution of 16.6 grams of chloroformic acid-butoxy-ethyl ester in 20 cc. of benzene. After working up the reaction mixture, 37 grams of the said ester are obtained which cannot be distilled and remains liquid.

EXAMPLE 16

*1-(3'-chloro-4'-methyl-phenyl)-piperazine-4-carboxylic acid-(2"-methoxy-4"-allyl-phenyl) ester*

To a solution of 21 grams of 1-(3'-chloro-4'-methyl-phenyl)-piperazine and 10 grams of triethylamine in 75 cc. of benzene are added dropwise at 0-5° C., while stirring and cooling, 22.6 grams of chloroformic acid-2-methoxy-4-allyl-phenyl ester in 25 cc. of benzene. The reaction mixture is stirred for another 2 hours while the temperature rises slowly to 20° C. and is then allowed to stand over night. It is worked up by addition of water, by separating the benzene layer, washing with water, drying the benzene and distilling it off. The residue can easily be recrystallized from alcohol. The compound melts at 123° C. and is obtained in a yield of 34 grams.

EXAMPLE 17

1-(3'-chloro-4'-methyl-phenyl)-piperazine-4-carboxylic acid-(3'''-chloro-4''-methyl-phenyl) ester 21 grams of 1-(3'-chloro-4'-methyl-phenyl)-piperazine are dissolved in 150 cc. of acetone and 14 grams of potassium carbonate are added. To this mixture are added dropwise at 0–5° C., while stirring and cooling, 20 grams of chloroformic acid-3-chloro-4-methyl-phenyl ester in 20 cc. of acetone. After stirring for a short time the reaction mixture is allowed to stand over night. By addition of water and benzene the reaction product is separated from the inorganic compounds and can be isolated from the benzene solution by drying and distilling off the benzene. After recrystallization from ethanol the new compound melts at 116–117° C. The yield amounts to 30 grams.

EXAMPLE 18

1-(3'-chloro-4'-methyl-phenyl)-piperazine-4-carboxylic acid-(β-chlorethyl) ester To a solution of 21 grams of 1-(3'-chloro-4'-methyl-phenyl)-piperazine and 10 grams of triethylamine in 75 cc. of benzene are added dropwise at 0–5° C., while stirring and cooling, 15 grams of chloroformic acid chlorethyl ester in 20 cc. of benzene. The mixture is stirred for another 2 hours, while the temperature rises to about 20° C., and is allowed to stand over night. By addition of water, separation of the benzene layer, by washing, drying and concentrating it, there is obtained a solid residue which, after recrystallization from highly boiling petroleum ether, melts at 72–74° C. and represents the said compound.

EXAMPLE 19

1-(3'-chloro-4'-methyl-phenyl)-piperazine-4-carboxylic acid-(β-diethyl-amino-ethyl) ester 16 grams of 1-(3'-chloro-4'-methyl-phenyl)-piperazine-4-carboxylic acid-(chlorethyl) ester (obtained according to Example 18) are heated for 5 hours at 120° C. with 20 grams of diethylamine in 50 cc. of alcohol in the bomb tube. After partial evaporation of this solution, the diethylamine hydrochloride that crystallizes at first is filtered off. The filtrate is acidified with alcoholic hydrochloric acid. After addition of a little ether the 1-(3'-chloro-4'-methyl-phenyl)-piperazine-4-carboxylic acid-(β-diethyl-amino-ethyl) ester hydrochloride is obtained in the form of well defined crystals. It melts at 192° C.

EXAMPLE 20

(a) 1-(3'-chloro-4'-methyl-phenyl)-piperazine-4-carboxylic acid-(4''-benzyloxy-phenyl) ester 26 grams of 1-(3'-chloro-4'-methyl-phenyl)-piperazine and 16 grams of triethylamine are dissolved in 100 cc. of benzene and the solution is cooled to 0–5° C. At this temperature there is added dropwise, while stirring, a solution of 33 grams of chloroformic acid-benzyloxyphenyl ester in 50 cc. of benzene during which time a precipitate separates in ample quantity. The reaction mixture is stirred for another 2 hours at room temperature and allowed to stand over hight. After working up according to the preceding examples and after evaporation of the benzene there remains a residue which melts at 154–155° C. after recrystallization from ethyl acetate and whose analysis corresponds with the data of the 1-(3'-chloro-4'-methyl-phenyl)-piperazine-4-carboxylic acid-(4''-benzyloxy-phenyl) ester.

(b) 1-(3'-chloro-4'-methyl-phenyl)-piperazine-4-carboxylic acid-(4''-hydroxy-phenyl) ester 15 grams of 1-(3'-chloro-4'-methyl-phenyl)-piperazine-4-carboxylic acid-(4'''-benzyloxy-phenyl) ester are dissolved in 200 cc. of methanol and treated for 24 hours at room temperature with hydrogen in a shaker and in the presence of a palladium catalyst. After 1.8 liters of hydrogen have been taken up, the experiment is interrupted, the solution is filtered and evaporated. The 1-(3'-chloro-4'-methyl-phenyl)-piperazine-4-carboxylic acid-(4''-hydroxyphenyl) ester is obtained in the form of crystals. After recrystallization from ethanol it melts at 214–215° C.

EXAMPLE 21

1-(3'-chloro-4'-methyl-phenyl)-piperazine-4-carboxylic acid-(4''-β-carbo-methoxy-vinyl-phenyl) ester To a solution of 21 grams of 1-(3'-chloro-4'-methyl-phenyl)-piperazine and 10 grams of triethylamine in 75 cc. of benzene are added dropwise, at 0–5° C., while cooling and stirring, 24 grams of chloroformic acid-para-(β-carbo-methoxy-vinyl)-phenyl ester in 25 cc. of benzene. After stirring for another 2 hours at room temperature, the reaction mixture is allowed to stand over night. The main quantity of the desired product has already crystallized. After addition of water it is filtered and washed with water. The product crystallizes from ethanol in silky lamellae melting at 147–148° C. After evaporation of the dried benzene solution and recrystallization of the residue a further quantity of the new product is obtained. The yield amounts to 29 grams.

We claim:

1. The compound of the formula

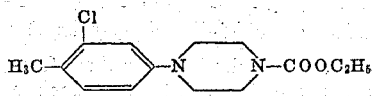

2. The compound of the formula

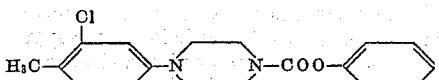

3. The compound of the formula

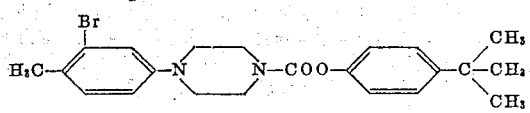

4. The compound of the formula

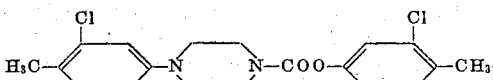

5. The compound of the formula

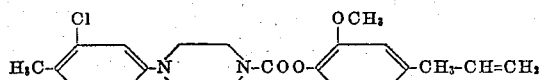

6. Piperazine-carboxylic acid esters of the general formula

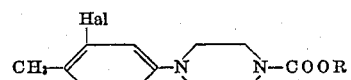

in which Hal is a member selected from the group consisting of chlorine and bromine, and R is a member of the group consisting of lower alkyl, lower alkoxyalkyl, chloroethyl, diethylaminoethyl, and the radical

wherein $R_1$ is a member of the group consisting of hydrogen, halogen, methyl, and methoxy, and $R_2$ is a member of the group consisting of hydrogen, hydroxy, methyl, tertiary butyl, isobutyl, isooctyl, nonyl, isododecyl, allyl, carboxyl, carbomethoxy vinyl, and carbalkoxy radicals of lower alkoxy compounds.

7. The method which comprises admixing at a temperature between −10° C. and +10° C. and in the presence of a member of the group consisting of alkali carbonates, alkali bicarbonates and triethylamine, equimolar quantities of a 1-(3'-halogeno-4'-methylphenyl)-piperazine and a halogen-containing formic acid ester of the general formula XCOOR in which X stands for a halogen atom and R is a member of the group consisting of lower alkyl, lower alkoxyalkyl, chloroethyl, diethylaminoethyl, and the radical

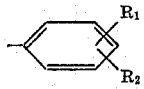

wherein $R_1$ is a member of the group consisting of hydrogen, halogen, methyl, and methoxy, and $R_2$ is a member of the group consisting of hydrogen, hydroxy, methyl, tertiary butyl, isobutyl, isooctyl, nonyl, isododecyl, allyl, carboxyl, carbomethoxy vinyl, and carbalkoxy radicals of lower alkoxy compounds.

References Cited in the file of this patent

UNITED STATES PATENTS

| | | |
|---|---|---|
| 2,672,460 | Conroy | Mar. 16, 1954 |
| 2,752,393 | Martin | June 26, 1956 |
| 2,836,594 | Parcell | May 27, 1958 |

OTHER REFERENCES

Stewart et al.: Jour. Org. Chem., vol. 13, pp. 134–153 (1948).

Pollard et al.: Jour. Amer. Chem. Soc., vol. 75, pp. 2989–2990 (1953).